No. 895,361. PATENTED AUG. 4, 1908.
W. H. GILBERT.
BELT CLAMP.
APPLICATION FILED JUNE 21, 1907.

Witnesses
J. T. L. Wright
J. W. Garner

Inventor
William H. Gilbert
By Victor J. Evans
Attorney

UNITED STATES PATENT OFFICE.

WILLIAM H. GILBERT, OF LINDSEY, OHIO.

BELT-CLAMP.

No. 895,361.  Specification of Letters Patent.  Patented Aug. 4, 1908.

Application filed June 21, 1907. Serial No. 380,141.

*To all whom it may concern:*

Be it known that I, WILLIAM H. GILBERT, a citizen of the United States of America, residing at Lindsey, in the county of Sandusky and State of Ohio, have invented new and useful Improvements in Belt-Clamps, of which the following is a specification.

This invention is an improved belt clamp for connecting the ends of power transmission belts together and enabling such belts to be tightened, as may be required, without having to first remove them from the pulleys, and said invention consists in the construction, combination and arrangement of devices hereinafter described and claimed.

Figure 1:
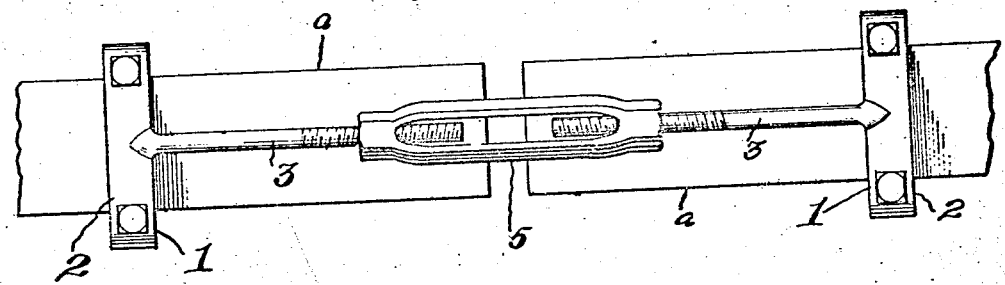
Figure 2:
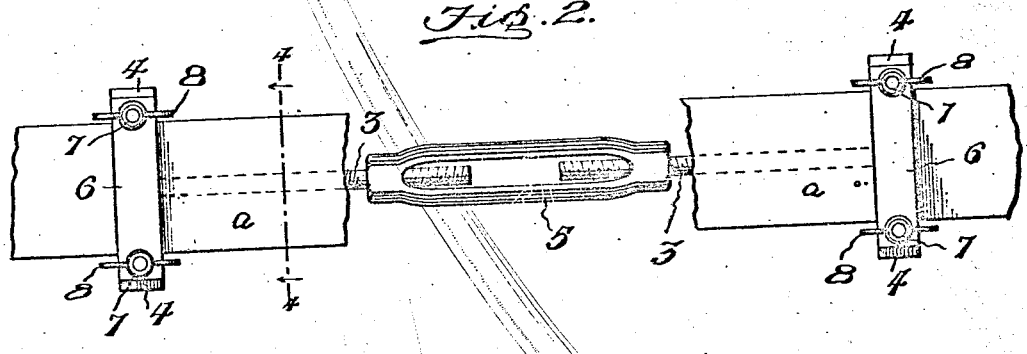
Figure 3:
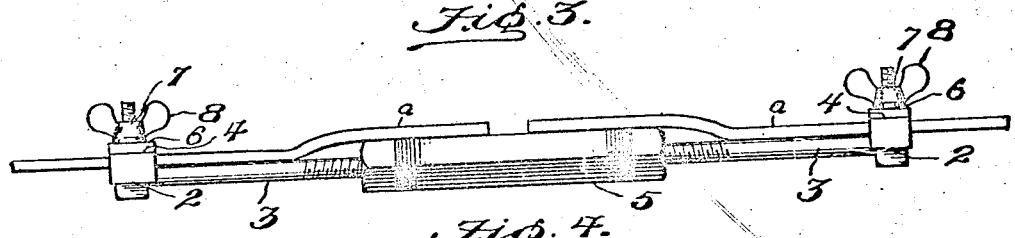
Figure 4:
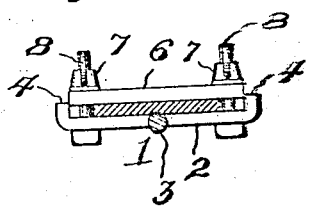

In the accompanying drawing,—Figure 1 is a plan view of a belt clamp embodying this invention, showing the same attached to the ends of the power transmission belt and connecting the same. Fig. 2 is a similar view, showing the opposite sides of the belt and of the clamp. Fig. 3 is an elevation at right angles to Fig. 1. Fig. 4 is a transverse sectional view taken on the plane indicated by the line 4—4 of Fig. 2.

In the construction of this improved belt clamp I employ a pair of heads or members 1, each of which comprises a cross arm 2 and a screw-threaded stem 3 which extends from the center thereof at right angles thereto. Such cross arm has its ends turned at right angles thereto, as at 4. The screw-threaded stems of the respective heads or members are oppositely threaded, one having a right-hand thread and the other a left-hand thread, as shown. A turn buckle link 5, which is provided at its ends with oppositely threaded openings for the reception of the respective stems of the heads or members 1, serves to connect such heads or members together and to adjust them longitudinally toward or from each other, according to the direction in which such turn buckle link is turned. In connection with each of the arms 2 I provide a bar 6, the length of which is such as to enable it to lie between the ends 4 of such arm. The ends of the belt *a* are placed between the arms 2 and the bars 6 and are clamped between such arms and bars by means of bolts 7 which connect such arms and bars together and are here shown as provided with winged nuts 8, which may be readily turned manually to tighten or loosen the grip of the arms and bars on the ends of such belt. Having thus attached the ends of the belt to the members of the clamp, it will be understood that the belt may be stretched or slackened, as may be required, by properly turning the turn buckle link 5.

A belt clamp as thus constructed is extremely cheap and simple, enables the ends of a belt to be held in place while a piece is being cut off to shorten the belt, and while the ends are being secured together by means of lacing, rivets, belt hooks, clamps or the like devices, and, moreover, such belt clamp may be very readily attached to the ends of a belt or removed therefrom without the necessity of first removing the belt from the pulleys which it connects.

Having thus described the invention, what is claimed as new, is:—

A belt clamp comprising a pair of coacting clamping members, each embodying a cross arm having a screw stem integral therewith and extending at right angles from the center of the outer face thereof, said cross arm being provided with upwardly bent ends, a clamping bar of a length to lie between the upwardly bent ends of the cross arm and to clamp the inserted end of the belt against the same, said upwardly bent ends of the cross arm engaging the ends of the bar and holding the latter against movement laterally of the belt, bolts passing upward through the cross arm adjacent the upwardly bent ends thereof and also through the bar and adapted to bear against the edges of the belt to retain the same against lateral displacement, clamping nuts engaging the upper ends of the bolts and bearing on the bar, the said screw stems of the clamping members being oppositely threaded and arranged in alinement in the plane of the center of the ends of the belt engaged by the respective clamping members, and a turn buckle engaging said opposite screw threaded stems and connecting such members together for longitudinal adjustment.

In testimony whereof, I affix my signature in presence of two witnesses.

WILLIAM H. GILBERT.

Witnesses:
C. G. BOWERS,
H. L. BOWERS.